United States Patent
Mochida (10) Patent No.: US 11,027,558 B2
(45) Date of Patent: Jun. 8, 2021

(54) RFID PRINTER APPARATUS

(71) Applicant: TOSHIBA TEC KABUSHIKI KAISHA, Tokyo (JP)

(72) Inventor: Yasuhiko Mochida, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/658,582

(22) Filed: Oct. 21, 2019

(65) Prior Publication Data

US 2020/0189289 A1 Jun. 18, 2020

(30) Foreign Application Priority Data

Dec. 14, 2018 (JP) .............................. JP2018-234005

(51) Int. Cl.
*B41J 2/355* (2006.01)
*B41J 3/407* (2006.01)

(52) U.S. Cl.
CPC .............. *B41J 2/355* (2013.01); *B41J 3/407* (2013.01)

(58) Field of Classification Search
CPC .................................. B41J 2/355; B41J 3/407
See application file for complete search history.

(56) References Cited

U.S. PATENT DOCUMENTS

| 2006/0138229 A1 | 6/2006 | Sugiyama |
| 2007/0222615 A1 | 9/2007 | Yamaguchi et al. |
| 2012/0057200 A1* | 3/2012 | Yamamoto ......... G06K 15/4065 358/1.15 |
| 2013/0215210 A1* | 8/2013 | McNestry ................ B41J 33/14 347/214 |
| 2015/0199594 A1 | 7/2015 | Kuniya |

FOREIGN PATENT DOCUMENTS

| EP | 1674272 A1 | 6/2006 |
| EP | 1837810 A1 | 9/2007 |
| JP | 2009179009 A | 8/2009 |

OTHER PUBLICATIONS

Extended European Search Report dated Feb. 26, 2020, mailed in counterpart European Application No. 19192561.9, 8 pages.

* cited by examiner

*Primary Examiner* — Jason S Uhlenhake
(74) *Attorney, Agent, or Firm* — Kim & Stewart LLP (57) ABSTRACT

According to one embodiment, an RFID tag or label printer apparatus includes a print head to print a pattern on the RFID tag, which includes an RFID chip at a predetermined mounting position. A processor is configured to receive the predetermined mounting position and label information including a print position for the pattern information to be printed on the RFID tag. The processor is configured to compare the predetermined mounting position to the print position and then control the print head to print the pattern information if the print position does not overlap a region through which the RFID chip passes when RFID tag is conveyed along a conveying direction past the print head for printing.

20 Claims, 7 Drawing Sheets

DIAGRAM SEEN FROM ARROW A

RFID PRINTER APPARATUS

CROSS-REFERENCE TO RELATED APPLICATION

This application is based upon and claims the benefit of priority from Japanese Patent Application No. 2018-234005, filed in Dec. 14, 2018, the entire contents of which are incorporated herein by reference.

FIELD

Embodiments described herein relate generally to an RFID printer apparatus.

BACKGROUND

In the related art, there is a thermal printer that includes a mechanism that adjusts the head pressure at which a thermal head is pressed against a platen roller according to the thickness of a printing medium.

However, in the related art, the structure of the thermal printer is complicated since the mechanism for adjusting the head pressure must be provided. As such, there is a problem in that the costs of the thermal printer increases.

DETAILED DESCRIPTION

In general, according to one embodiment, an RFID printer apparatus for printing information on RFID tags includes a print head to print a pattern on an RFID tag that includes a RFID chip, which is at a predetermined mounting position on the RFID tag. A processor of the RFID printer apparatus is configured to receive and/or acquire the predetermined mounting position. The processor also receives label information for the RFID tag. The label information includes a print position for pattern information to be printed on the RFID tag. The processor compares the predetermined mounting position to the print position and controls the print head to print the pattern information if the print position does not overlap a region through which the RFID chip passes when RFID tag is conveyed along a conveying direction past the print head.

Hereinafter, an example embodiment will be described with reference to the accompanying drawings.

Schematic Configuration of Label Printer

Figure 1A:
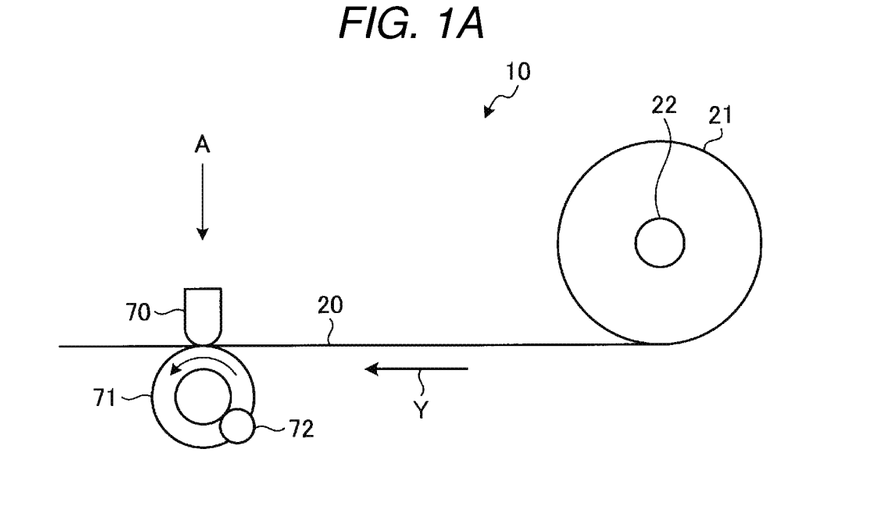
FIGS. 1A and 1B depict structural aspects of an RFID printer apparatus according to an embodiment.
Figure 1B:
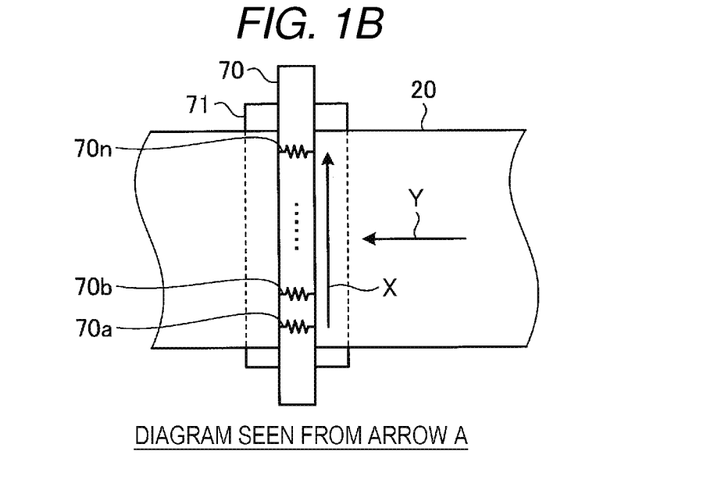

FIGS. 1A and 1B are structural diagrams illustrating a schematic example of an RFID printer apparatus 10 according to an embodiment. The RFID printer apparatus 10 can be a printer that is used in a supermarket or the like and prints label information on an RFID label 30 (refer to FIGS. 2A and 2B) to be attached to a sales commodity or item. As illustrated in FIG. 1A, the RFID printer apparatus 10 includes a thermal head 70, a platen roller 71, and a stepping motor 72.

A plurality of RFID labels 30 (refer to FIGS. 2A and 2B) are attached to a label mount 20 in an aligned state. A roll 21 around which the label mount 20 has been wound is accommodated in a paper holding portion (of the RFID printer apparatus 10 in a state in which the roll 21 is rotatable around a roll shaft 22. The roll 21 can be replaced and removed from the paper accommodation portion as necessary. In general, the RFID labels 30 are supplied as printing media to the RFID printer apparatus 10.

The stepping motor 72 is a drive source for rotating the platen roller 71. The stepping motor 72 is driven by a control signal from an input and output (I/O) controller 60 (refer to FIG. 3) described below and rotatably drives the platen roller 71 via a gear or the like. Due to the driving of the platen roller 71, the label mount 20 is drawn out from the roll 21 and conveyed (fed) along a conveying direction (sub-scanning direction) Y.

FIG. 1B is a diagram illustrating the RFID printer 10 of FIG. 1A when viewed from a direction indicated by the arrow A. As illustrated in FIG. 1B, the thermal head 70 is provided along a direction orthogonal to the conveying direction Y. In the thermal head 70, a plurality of heating elements (70a, 70b ... 70n) are arranged in a row along a main scanning direction X that is orthogonal to the conveying direction Y. The label mount 20 is pressed by the thermal head 70 and the platen roller 71 while being conveyed through a conveyance path (nip) between the thermal head 70 and the platen roller 71.

The heating elements 70a to 70n included in the thermal head 70 selectively generate heat according to a control signal from the I/O controller 60. The thermal head 70 prints label information on the RFID label 30 by generating heat from each one of the heating elements (70a to 70n) at a particular position along the main scanning direction X corresponding to the label information to be printed. The RFID label 30 on which the label information has been printed is discharged from a paper discharge port along with the label mount 20.

Configuration of Label Mount

Figure 2A:
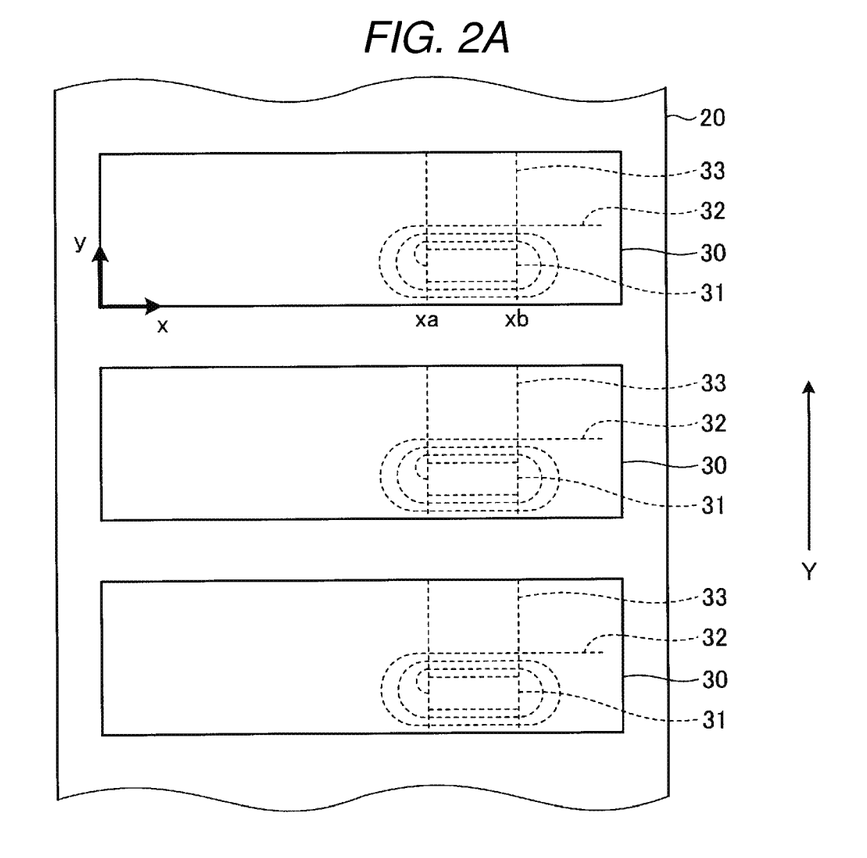
FIGS. 2A and 2B depict an example of a label mount.
Figure 2B:
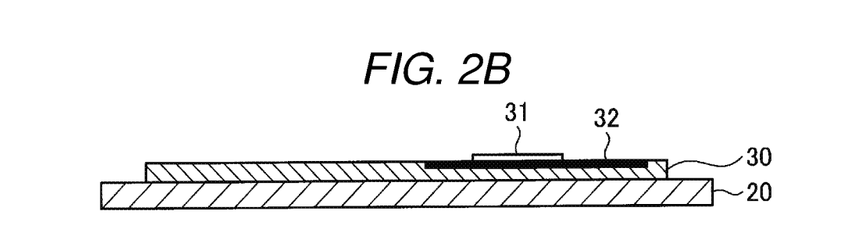

FIGS. 2A and 2B depict an example of the label mount 20. In particular, FIG. 2A is a top view illustrating the label mount with multiple RFID labels 30 thereon. FIG. 2B is a cross-sectional view of the label mount 20. As illustrated in FIGS. 2A and 2B, RFID labels 30 are arranged on the label mount 20 in an aligned state at predetermined intervals. Specifically, the RFID labels 30 are arranged on the surface of the label amount 20. Back surfaces of the RFID labels 30 are releasable (peelable) from the surface of the label amount 20. Coordinate positions on the RFID label 30 are referenced to an x-axis along the main scanning direction X and a y-axis along the conveying direction Y of each label. A coordinate position on an RFID label 30 is represented by (x, y). In general, origin of the xy coordinate system may be arbitrarily set. Here, as illustrated in FIG. 2A, a position on the lower left side of the RFID label 30 is set as the origin.

The RFID label 30 is formed of a heat-sensitive paper that changes color with the heat generated by the thermal head 70. An RFID chip 31 and an antenna 32 are mounted on or embedded in the RFID label 30. The RFID label 30 is an example of an RFID tag.

The RFID chip 31 is an integrated circuit (IC) chip that stores commodity information or the like for a commodity to which the RFID label 30 with the RFID chip 31 is to be attached. In the RFID labels 30 illustrated in FIG. 2A, a mounting position of the RFID chip 31 along the x-axis direction is in a range of position xa to position xb. This mounting position does not change for any of the RFID labels 30 arranged on the label mount 20.

The antenna 32 receives a radio wave from a tag reader/writer which activates the RFID chip 31. In addition, the antenna 32 transmits information, such as commodity information registered in the RFID chip 31, to the reader/writer. The antenna 32 is formed by performing an etching process on a flexible substrate or the like.

As illustrated in FIG. 2B, the RFID chip 31 is thicker than the antenna 32, and thus protrudes from RFID label 30. Accordingly, when the RFID printer apparatus 10 executes a printing on a RFID label 30, the thermal head 70 may come into contact with the RFID chip 31.

The specific mounting position of the RFID chip 31 on the RFID labels 30 is generally determined by the user stores and may thus vary store to store. Therefore, in the RFID printer apparatus 10 according to the present embodiment, it is assumed that the thermal head 70 comes into contact with the RFID chip 31 during printing. When the thermal head 70 comes into contact with the RFID chip 31, the heating elements from among the heating elements 70a to 70n that comes into contact with the RFID chip 31 may be damaged or disconnected by the contact. Therefore, in the present embodiment, printing is not executed using those heating elements from among the heating elements 70a to 70n that may come into contact with the RFID chip 31. Even when a heating element is disconnected, the operation of the RFID printer apparatus 10 continues.

Figure 3:
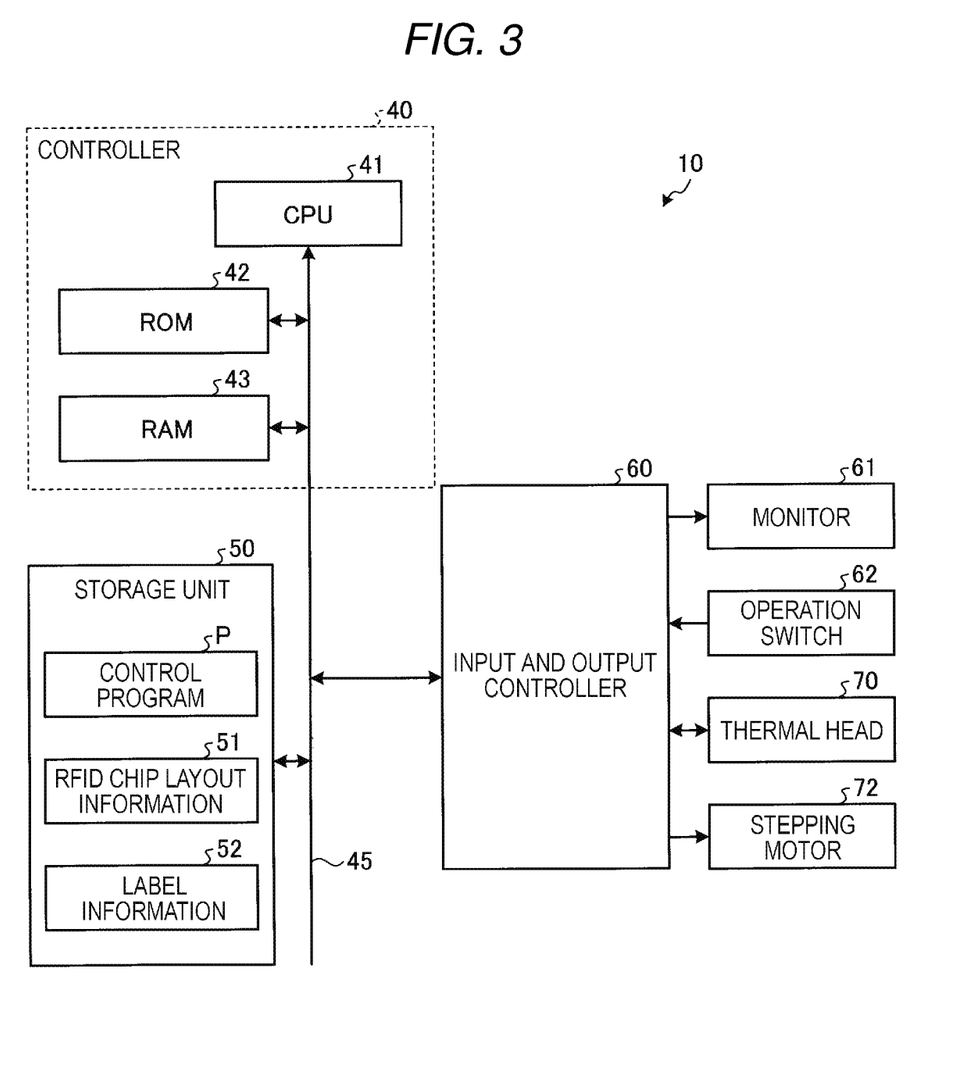
FIG. 3 is a hardware block diagram of a RFID printer apparatus.

Hardware Configuration of RFID Printer Apparatus FIG. 3 is a hardware block diagram illustrating an example of a hardware configuration of the RFID printer apparatus 10 according to an embodiment.

The RFID printer apparatus 10 includes a controller 40, a storage unit 50, and the I/O controller 60.

The controller 40 includes a central processing unit (CPU) 41, a read only memory (ROM) 42, and a random access memory (RAM) 43. The CPU 41 is connected to the ROM 42 and the RAM 43 through a bus 45. The CPU 41 loads various programs stored in the ROM 42 or the storage unit 50 to the RAM 43. The CPU 41 controls the RFID printer apparatus 10 by operating in accordance with the programs loaded to the RAM 43. That is, the controller 40 may be a general computer in some examples.

Further, the controller 40 is connected to the storage unit 50 and the I/O controller 60 through the bus 45.

For example, the storage unit 50 is a nonvolatile memory such as a flash memory or a hard disk drive (HDD) that stores storage information even after the power is turned off. The storage unit 50 stores programs including a control program P or the like. The control program P is a software program controlling the functions of the RFID printer apparatus 10.

The control program P may be provided as embedded in the ROM 42. In addition, the control program P may be recorded in a non-transitory computer-readable recording medium such as a CD-ROM, a flexible disk (FD), a CD-R, or a digital versatile disc (DVD) in a file format that is installable or executable by the controller 40. In addition, the control program P may be stored in a computer connected to a network, such as the Internet, and downloaded or provided through the network. In addition, the control program P may be distributed across a network such as the Internet.

The storage unit 50 stores RFID chip layout information 51 and label information 52.

The RFID chip layout information 51 is information indicating a mounting position of the RFID chip 31 on the RFID label 30 (RFID tag). The RFID chip layout information 51 includes, for example, information that is set for each roll 21 that is loaded.

The label information 52 includes pattern information 35 (refer to FIG. 5) to be printed on the RFID label 30 and a print position for the pattern information 35.

The I/O controller 60 is connected to a monitor 61 and an operator input unit 62. In addition, the I/O controller 60 is connected to the thermal head 70 and the stepping motor 72. The I/O controller 60 controls various types of connected hardware in accordance with an instruction from the controller 40.

The monitor 61 displays the pattern information 35 to be printed on the RFID label 30, various buttons for controlling the operation of the RFID printer apparatus 10, the result of a dot missing check by the RFID printer apparatus 10, and the like. The monitor 61 is, for example, a liquid crystal display.

The operator input unit 62 (also referred to as an "operation switch") is, for example, a touch panel that is provided to overlap the monitor 61. The touch panel detects inputs from an operator with respect to the various buttons displayed on the monitor 61 and transmits information corresponding to the operator inputs to the controller 40. The operator input unit 62 is not limited to a touch panel and may be, for example, a mechanical switch or button provided on a main body of the RFID printer apparatus 10.

The thermal head 70 causes the heating elements 70a to 70n to selectively generate heat according to the pattern information 35 for printing on the RFID label 30 based on an instruction from the I/O controller 60. As a result, the pattern information 35 is printed on the RFID label 30.

The stepping motor 72 is driven based on an instruction from the I/O controller 60 to rotate the platen roller 71. Due to the rotation of the platen roller 71, the label mount 20 is conveyed along the conveying direction Y.

Functional Configuration of Controller 40

Figure 4:
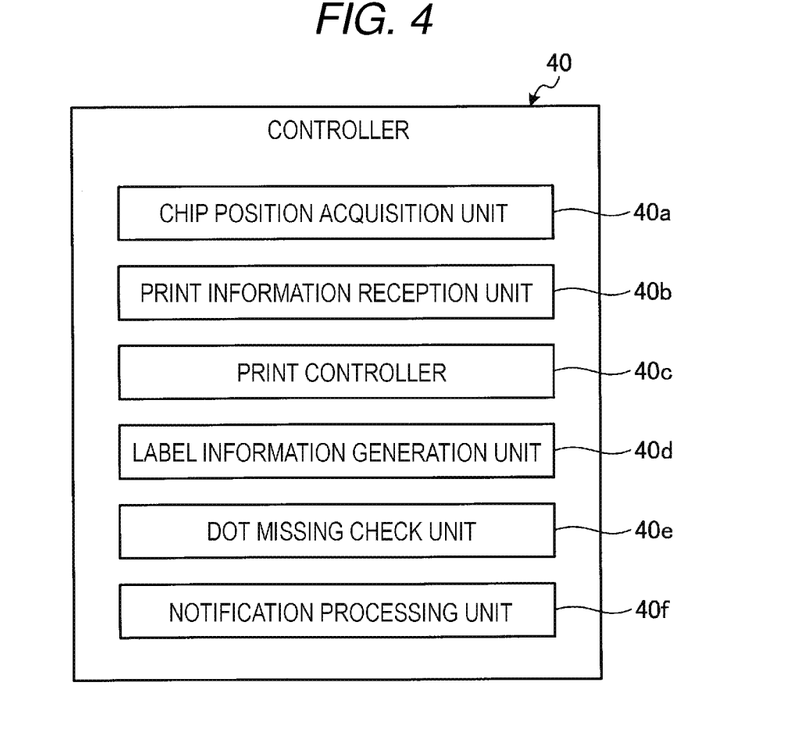
FIG. 4 is a functional block diagram of a RFID printer apparatus.

FIG. 4 is a functional block diagram illustrating an example of a functional configuration of the RFID printer apparatus 10 according to an embodiment. The controller 40 functions as a chip position acquisition unit 40a, a print information reception unit 40b, a print controller 40c, a label information generation unit 40d, a dot missing check unit 40e, and a notification processing unit 40f. These functional units of the controller 40 are implemented by loading the control program P to the RAM 43 and then executing the control program P.

The chip position acquisition unit 40a acquires the mounting position of the RFID chip 31 on the RFID label 30 (RFID tag).

The print information reception unit 40b receives the label information 52 including the pattern information 35 and the print position for the pattern information 35. The label information may be information stored in the storage unit 50 or may be information generated by the label information generation unit 40d described below.

In addition, the print information reception unit 40b causes the notification processing unit 40f to execute notification and inhibits the print controller 40c from printing the pattern information 35 if the print position of the received pattern information 35 overlaps a region where the RFID chip 31 passes when the RFID label 30 moves along the conveying direction Y. The determination as to whether a print position overlaps the region of the RFID 31 is based on the mounting information acquired by the chip position acquisition unit 40a.

The print controller 40c prints the pattern information 35 on the RFID label 30 when the print position of the pattern information 35 (received by the print information reception unit 40b) does not overlap the region through which the RFID chip 31 passes as the RFID labels 30 are moved along the conveying direction Y. The print controller 40c may also be referred to as a print control unit.

The print controller 40c executes necessary printing by converting the print position of the pattern information 35 into positions of the heating elements 70a to 70n. Specifically, a correspondence table in which the print position in the RFID label 30 is associated with the positions of the heating elements 70a to 70n is created in advance and is stored in, for example, the ROM 42. During printing, the print controller 40c reads the correspondence table from the ROM 42, reads the print position of the pattern information 35, and then converts the print position of the pattern information 35 into the positions of the heating elements 70a to 70n to be activated based on the correspondence table.

The label information generation unit 40d generates the label information 52, which incorporates the pattern information 35 and the print position of the pattern information 35.

In addition, the label information generation unit 40d causes the notification processing unit 40f to execute a notification if the print position of the generated pattern information 35 overlaps the region where the RFID chip 31 passes.

The dot missing check unit 40e executes "a dot missing check" on the thermal head 70 by checking connection states of the plurality of heating elements 70a to 70n. The dot missing check may also be referred to as a "disconnection check." The dot missing check unit 40e skips the reading the results of checks on those heating elements 70a to 70n that are at a position corresponding to the mounting position of the RFID chip 31 that is acquired by the chip position acquisition unit 40a. Alternatively, the dot missing check unit 40e does not execute a check on those of the heating elements 70a to 70n at a position corresponding to the mounting position of the RFID chip 31.

The notification processing unit 40f executes notifications according to an instruction from the print information reception unit 40b or the label information generation unit 40d. Specifically, the notification processing unit 40f signals to a user of the RFID printer apparatus 10 by displaying or outputting a message or alarm to the monitor 61 to indicate that the pattern information 35 overlaps a print prevention region 33. The notification processing unit 40f can also be referred to as a notification unit.

Label Information

Figure 5:
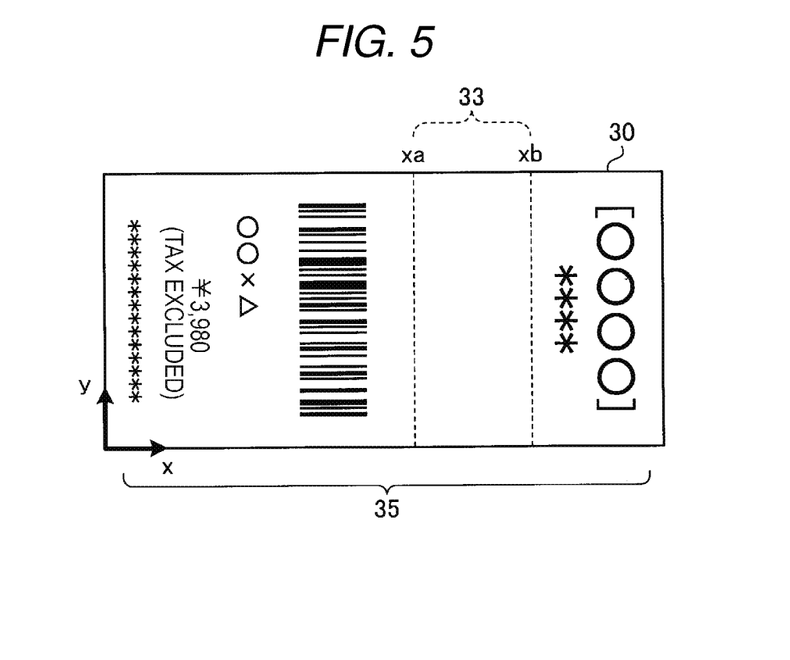
FIG. 5 depicts an example of label information that is printed by a RFID printer apparatus.

FIG. 5 is a diagram illustrating an example of the label information that is printed by the RFID printer apparatus 10. As illustrated in FIG. 5, the pattern information 35 is printed on the RFID label 30. The pattern information 35 includes commodity information, such as a barcode, price, product name, or the like.

In FIG. 5, the range of an position xa to position xb along the x-axis direction of the RFID label 30 is the print prevention region 33. As described above, the print prevention region 33 is the region where the RFID chip 31 passes when moving along the conveying direction Y (see FIG. 2). That is, the position xa along the x-axis is a left end position of the RFID chip 31 or approximately so. The position xb along the x-axis is a right end position of the RFID chip 31 or approximately. As described above, the print prevention region 33 is set based on the mounting position of the RFID chip 31 that is acquired by the chip position acquisition unit 40a.

The thermal head 70 prints the pattern information 35 on a region of the RFID label 30 other than the print prevention region 33.

Dot Missing Check Method

Figure 6:
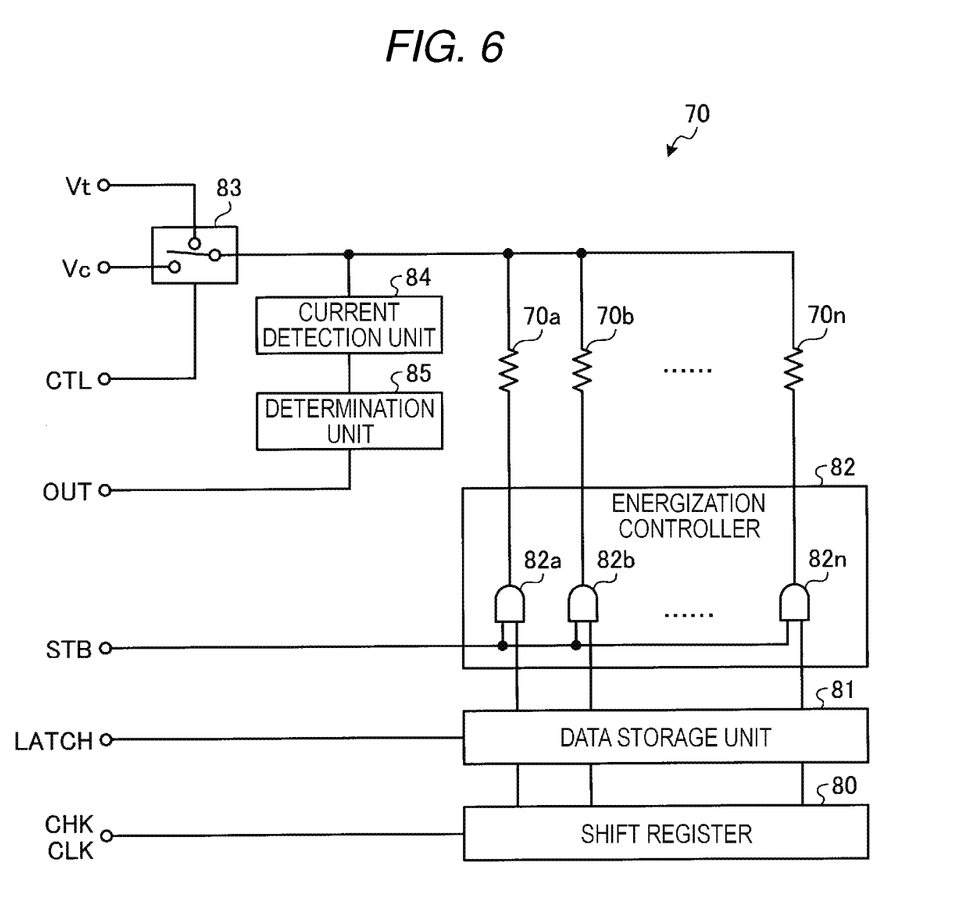
FIG. 6 is a schematic diagram of a thermal head.

FIG. 6 is a schematic diagram illustrating a structure of the thermal head 70. As illustrated in FIG. 6, the thermal head 70 includes a shift register 80, a data storage unit 81, an energization controller 82, the heating elements 70a, 70b ... 70n, a voltage selection unit 83, a current detection unit 84, and a determination unit 85. Among these, the shift register 80, the data storage unit 81, and the energization controller 82 are components for executing a print control by individually turning on or off individual ones of the heating elements 70a to 70n. The voltage selection unit 83, the current detection unit 84, and the determination unit 85 are components required for executing a dot missing check in cooperation with the shift register 80, the data storage unit 81, and the energization controller 82.

The shift register 80 generates a signal for specifying a particular heating element (of the elements 70a ... 70n) that is a target for the dot missing check. A check signal CHK is a serial signal for selecting a heating element. The check signal CHK is sent from the controller 40 through the I/O controller 60 is converted into a parallel signal by shifting the check signal CHK to a position of a signal line in one-to-one correspondence with the heating element to be checked using a clock pulse CLK.

The data storage unit 81 temporarily stores the check signals CHK being converted into the parallel signal by the shift register 80 using a latch signal LATCH that is sent from the controller 40 through the I/O controller 60.

The energization controller 82 includes, for example, AND gates 82a, 82b ... 82n and causes the heating elements 70a to 70n to selectively generate heat using a strobe signal STB (for example, a TTL signal) that is received from the controller 40 through the I/O controller 60. Specifically, a strobe signal STB having a voltage of 5 V (at a Hi level of a TTL signal) is input at a timing at which the heating elements 70a to 70n selectively generate heat. At this time, the check signal CHK (at a Hi level of a TTL signal) is supplied from the data storage unit 81 to an AND gate corresponding to the heating element that is to selectively generate heat. Accordingly, a voltage of 5 V is output from only the AND gate corresponding to the selected heating element that is a target for the dot missing check. As a result, only the selected heating element generates heat. Although not specifically illustrated in FIG. 6, in general, a switching element such as a transistor that executes a switching operation based on an output of the AND gate is mounted on a rear stage of the AND gates 82a to 82n. By the switching element executing a switching operation, a current flows through the selected heating element to generate heat.

The voltage selection unit 83 switches between a voltage applied to the thermal head 70 when executing a normal printing operation and a voltage applied when the thermal head 70 executes the dot missing check. The voltage selection unit 83 is configured with, for example, a selector. The voltage selection unit 83 switches between a voltage Vc (for example, 24 V) applied during the normal printing operation and a voltage Vt (for example, 5 V) applied during the dot missing check in accordance with a control signal CTL that is received from the controller 40 through the I/O controller 60.

The current detection unit 84 detects the magnitude of the current flowing through the selected heating element that is the target for the dot missing check. Specifically, the current detection unit 84 detects the current flowing through the heating element being checked using the applied voltage Vt. The current detection unit 84 calculates a resistance value of the heating element based on the detected current and applied voltage Vt.

The determination unit 85 determines whether or not the heating element being checked is considered a failure (i.e., "missing dot" or "dot missing") based on the resistance value calculated by the current detection unit 84. The determination unit 85 outputs the determination result to, for example, the monitor 61 as a determination signal OUT.

The dot missing check unit 40e (refer to FIG. 4) executes the dot missing check by checking each of the plurality of heating elements 70a to 70n included in the thermal head 70 illustrated in FIG. 6 at a predetermined timing or time. In this context, a predetermined time may be the time at which the power of the RFID printer apparatus 10 is turned on or an initialization process.

If one of the heating elements 70a to 70n receives an impact, a resistor element in the heating element might be damaged or is broken (disconnected) in some instances. In this case, the resistance value of the heating element 70a to 70n changes from its normal or expected resistance value. In particular, when the resistor element is broken, the resistance value effectively becomes infinite. The dot missing check unit 40e calculates the resistance value of each of the heating elements 70a to 70n by detecting a current value flowing therethrough when a predetermined voltage is applied. When a difference between the calculated resistance value and the normal condition resistance value is higher than or equal to a predetermined threshold value, the dot missing check unit 40e determines that dot missing failure has occurred.

The reason why the voltage applied during the dot missing check is set to be a low by the voltage selection unit 83 is so the amount of heat generated from the heating elements 70a to 70n being tested will be low and any RFID label 30 will not be discolored in the testing.

Flow of Printing

Figure 7:
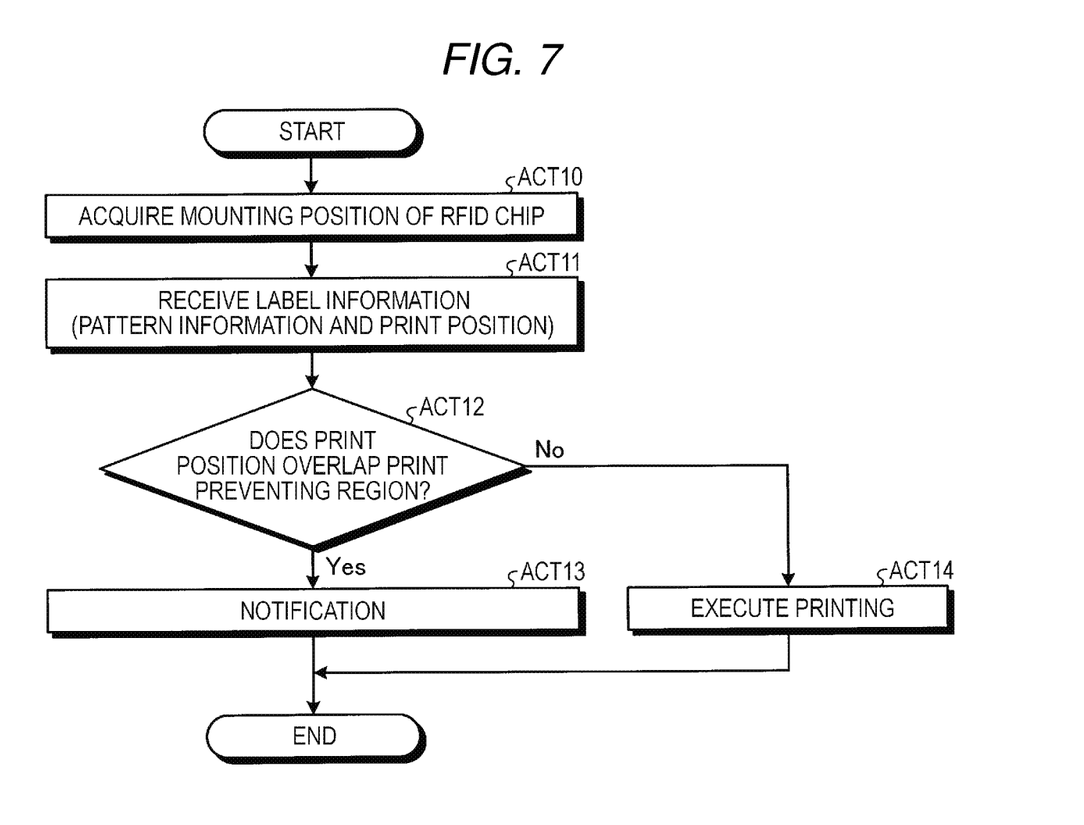
FIG. 7 is a flowchart of a printing process executed by a RFID printer apparatus.

FIG. 7 is a flowchart illustrating an example of a flow of the printing process that is executed by the RFID printer apparatus 10.

First, the chip position acquisition unit 40a acquires the mounting position of the RFID chip 31 from the storage unit 50 (ACT 10).

Next, the print information reception unit 40b receives the label information 52 (including the pattern information 35 and the print position of the pattern information 35) from the storage unit 50 (ACT 11). In some examples, the label information 52 received by the print information reception unit 40b may be generated by the label information generation unit 40d instead of the label information 52 already stored in the storage unit 50.

The print controller 40c determines whether or not the print position of the pattern information 35 overlaps the print prevention region 33 (ACT 12). When the print controller 40c determines that the print position of the pattern information 35 overlaps the print prevention region 33 (ACT 12: Yes), the process proceeds to ACT 13. On the other hand, when the print controller 40c determines that the print position of the pattern information 35 does not overlap the print prevention region 33 (ACT 12: No), the process proceeds to ACT 14.

When the print controller 40c determines that the print position of the pattern information 35 overlaps the print prevention region 33 in ACT 12, the notification processing unit 40f executes a notification by displaying the determination result on the monitor 61 in ACT 13. Next, the RFID printer apparatus 10 ends the process of FIG. 7.

When the print controller 40c determines that the print position of the pattern information 35 does not overlap the print prevention region 33 in ACT 12, the print controller 40c prints the pattern information 35 in ACT 14. Next, the RFID printer apparatus 10 ends the process of FIG. 7.

Flow of Dot Missing Check

Figure 8:
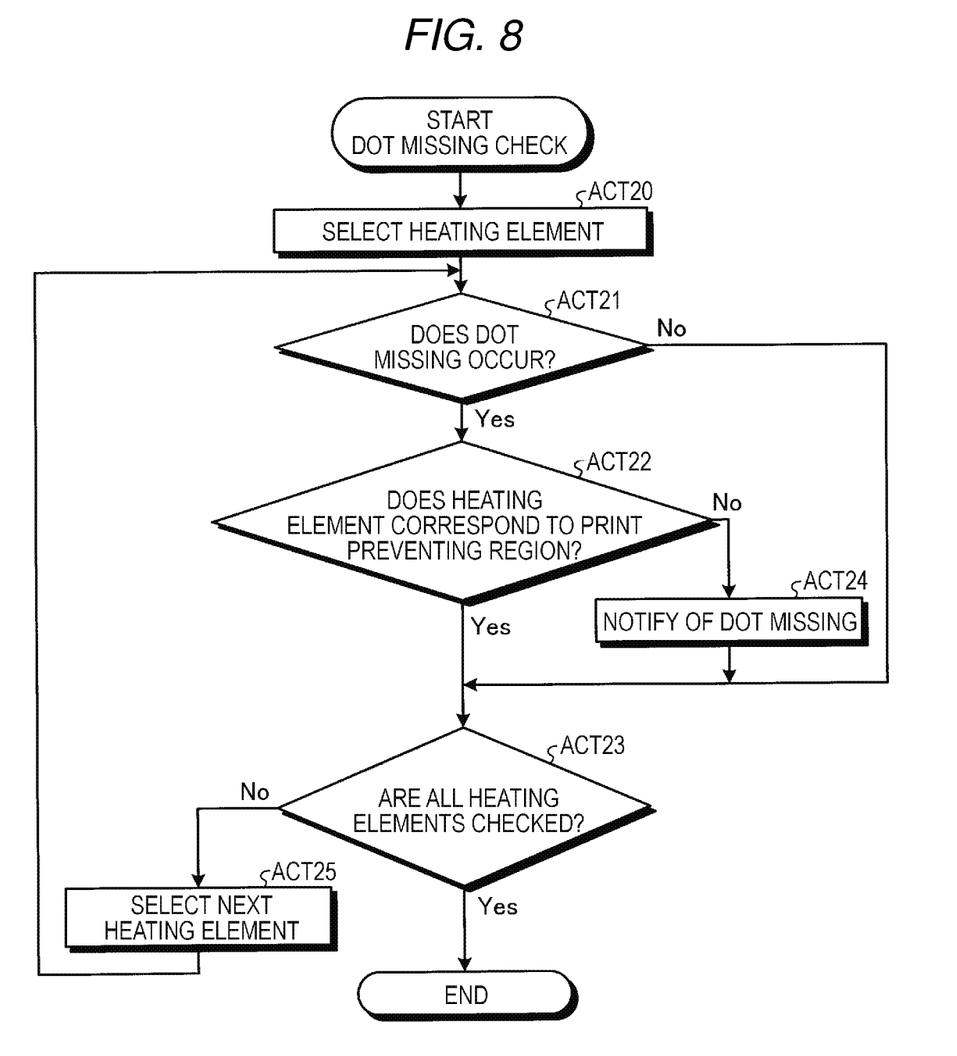
FIG. 8 is a flowchart of a dot missing check process that is executed by a RFID printer apparatus.

FIG. 8 is a flowchart illustrating an example of a flow of the dot missing check that is executed by the RFID printer apparatus 10. The dot missing check unit 40e executes the dot missing check illustrated in FIG. 8 at a predetermined timing or time.

The dot missing check unit 40e selects a heating element on which the dot missing check is to be executed (ACT 20).

The dot missing check unit 40e determines whether or not dot missing failure occurs in the selected heating element (ACT 21). When the dot missing check unit 40e determines that a dot missing failure occurs in the selected heating element (ACT 21: Yes), the process proceeds to ACT 22. On the other hand, when the dot missing check unit 40e determines that a dot missing failure does not occur in the selected heating element (ACT 21: No), the process proceeds to ACT 23. Whether or not dot missing failure occurs is determined using the above-described method.

When the dot missing check unit 40e determines that dot missing failure occurs in the selected heating element in ACT 21, the dot missing check unit 40e determines whether or not the heating element for which dot missing failure has occurred is a heating element overlapping with the print prevention region 33 in ACT 22. When the dot missing check unit 40e determines that the heating element determined that dot missing failure has occurred in a heating element corresponding to the print prevention region 33 (ACT 22: Yes), the process proceeds to ACT 23. That is, the dot missing check unit 40e skips responding to the result of the dot missing check for those heating elements corresponding to the print prevention region 33. On the other hand, when the dot missing check unit 40e determines that the heating element with the dot missing failure is not a heating element corresponding to the print prevention region 33 (ACT 22: No), the process proceeds to ACT 24.

In ACT 23, the dot missing check unit 40e determines whether all the heating elements 70a to 70n have been checked yet, and if so (ACT 23: Yes), the RFID printer apparatus 10 ends the process of FIG. 8. On the other hand, when the dot missing check unit 40e determines that all the heating elements 70a to 70n have not yet been checked (ACT 23: No), the process proceeds to ACT 25.

If the dot missing check unit 40e determines in ACT 22 that the heating element with dot missing failure is not a heating element corresponding to the print prevention region 33, the notification processing unit 40f performs a notification process for notifying of a dot missing failure in ACT 24, before the process proceeds to ACT 23.

As noted, when the dot missing check unit 40e determines in ACT 23 that all the heating elements 70a to 70n have not yet been checked, the dot missing check unit 40e selects in ACT 25 the next heating element on which the dot missing check is to be executed. Next, the process returns to ACT 21 and the above-described processes are repeated.

Although not specifically illustrated in FIG. 8, the dot missing check may be skipped for those heating elements corresponding to (overlapping) the print prevention region 33. For example, the heating elements within the range of the position xa along the x-axis to the position xb along the x-axis in FIG. 5 may be excluded from testing entirely by non-selection. That is, in ACT 20 of FIG. 8, the heating elements corresponding to the print prevention region 33 may be pre-excluded from the pool of heating elements to be selected for testing.

As described above, in the RFID printer apparatus 10 according to an embodiment, the chip position acquisition unit 40a acquires the mounting position of the RFID chip 31 in the RFID label 30 (RFID tag), and the print information reception unit 40b receives the label information 52 including the pattern information 35 and the print position of the pattern information 35. The print controller 40c prints the pattern information 35 on the RFID label 30 if the print position of the pattern information 35 does not overlap the region where the RFID chip 31 passes as the RFID label 30 (RFID tag) moves along the conveying direction Y. Accordingly, it is possible to provide an RFID printer apparatus 10 that can print the label information 52 on positions of the RFID label 30 other than the mounting position of the relatively thick RFID chip 31. This can be achieved with a relatively simple structure as compared to an RFID printer for which an thermal head adjustment mechanism or the like for varying a head pressure during RFID label printing is utilized.

In addition, in an RFID printer apparatus 10 according to an embodiment, the print information reception unit 40b causes the notification processing unit 40f to execute a notification and can inhibit or prevent the print controller 40c from printing the pattern information 35 if the print position of the received pattern information 35 overlaps the region where the RFID chip 31 passes. Accordingly, it is possible to adopt a configuration in which pattern information 35 is not printed on the region where the thick RFID chip 31 passes when moving along the conveying direction Y.

In addition, in an RFID printer apparatus 10 according to an embodiment, when the dot missing check unit 40e execute the dot missing check on the thermal head 70 by checking the plurality of heating elements 70a to 70n, the dot missing check unit 40e can skip the reading of the dot missing check on those heating elements at positions corresponding to the mounting position of the RFID chip 31. Accordingly, even when a disconnection or the like occurs in a heating element due to a contact of the thermal head 70 with the RFID chip 31, the user of the RFID printer apparatus 10 can continue to use the RFID printer apparatus 10 without concern.

In addition, in an RFID printer apparatus 10 according to an embodiment, when the dot missing check unit 40e executes the dot missing check of the thermal head 70 by checking states of the plurality of heating elements 70a to 70n, the dot missing check unit 40e does not need to execute the dot missing check on any heating element at a position corresponding to the acquired mounting position of the RFID chip 31. Accordingly, even when disconnection or the like occurs in the heating element due to a contact in a range where the thermal head 70 comes into contact with the RFID chip 31, the user of the RFID printer apparatus 10 can continue to use the RFID printer apparatus 10 without concern.

In addition, an RFID printer apparatus 10 according to an embodiment includes the label information generation unit 40d that generates the label information 52 (incorporating the pattern information 35 and the print position of the pattern information 35) or portions thereof. Accordingly, the user of the RFID printer apparatus 10 can generate the label information 52 while using the RFID printer apparatus 10 rather than pre-generating the label information.

In addition, in an RFID printer apparatus 10 according to an embodiment, the label information generation unit 40d causes the notification processing unit 40f to execute a notification if the print position of the generated pattern information 35 overlaps the region where the RFID chip 31 passes. Accordingly, when the generated pattern information 35 overlaps the print prevention region 33, the print position can be modified before printing.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A RFID tag printer apparatus, comprising:
a print head to print a pattern on an RFID tag that includes an RFID chip at a predetermined mounting position within the RFID tag; and
a processor configured to:
receive the predetermined mounting position,
receive label information including a print position for pattern information to be printed on the RFID tag, and
compare the predetermined mounting position to the print position and control the print head to print the pattern information only if the print position does not overlap a region through which the RFID chip passes when RFID tag is conveyed along a conveying direction past the print head.

2. The apparatus according to claim 1, wherein the processor is further configured to generate a notification indicating the print position overlaps the region through which the RFID chip passes when comparison of the predetermined mounting position to the printing position indicates the print position overlaps the region.

3. The apparatus according to claim 2, wherein the notification prevents the print head from printing the pattern information.

4. The apparatus according to claim 1, wherein the print head is a thermal print head.

5. The apparatus according to claim 1, wherein the print head comprises a plurality of heating elements disposed along a direction intersecting the conveying direction.

6. The apparatus according to claim 5, wherein the processor is further configured to execute a dot missing check on the print head by checking states of the plurality of heating elements.

7. The apparatus according to claim 6, wherein the processor is further configured to skip reading of a result of the dot missing check on any heating elements at a position corresponding to the mounting position of the RFID chip.

8. The apparatus according to claim 6, wherein the processor is further configured to skip checking the states of any heating element at a position corresponding to the mounting position of the RFID chip.

9. The apparatus according to claim 1, wherein the processor is further configured to generate at least a portion of the label information.

10. The apparatus according to claim 1, further comprising:
a storage unit, wherein the predetermined mounting position is stored in the storage unit.

11. A RFID tag printer apparatus, comprising:
a processor;
a thermal print head to print a pattern on an RFID tag that includes an RFID chip at a predetermined mounting position within the RFID tag, wherein
the thermal print head comprises a plurality of heating elements disposed along a direction intersecting a conveying direction of the RFID tag past the thermal print head, and
the processor is configured to:
receive the predetermined mounting position, and
execute a dot missing check on the thermal print head by checking connection states of only those of the plurality of heating elements at positions outside a region through which the RFID chip passes when the RFID tag within the label is conveyed in the conveying direction past the thermal print head.

12. The apparatus according to claim 11, wherein only those of the plurality of heating element at positions outside the region through which the RFID chip passes when the RFID tag is conveyed past the thermal print head are checked during the dot missing check.

13. The apparatus according to claim 11, wherein those of the plurality of heating element at a position corresponding to the region through which the RFID chip passes when the RFID tag is conveyed past the thermal print are not checked during the dot missing check.

14. The apparatus according to claim 11, wherein the processor is further configured to:
receive label information including a print position for pattern information to be printed on the RFID tag, and
compare the predetermined mounting position to the print position and control the thermal print head to print the pattern information only if the print position does not overlap the region through which the RFID chip passes when RFID tag is conveyed in the conveying direction past the print head.

15. The apparatus according to claim 14, wherein the processor is further configured to generate a notification indicating the print position overlaps the region through which the RFID chip passes when comparison of the predetermined mounting position to the printing position indicates the print position overlaps the region.

16. An RFID tag printer apparatus, comprising:
a thermal print head;
an RFID tag conveyor to convey an RFID tag along a conveying direction past the thermal print head, the RFID tag including an RFID chip at a predetermined mounting position, the RFID chip protruding outward in a direction orthogonal to a printable label surface of the RFID tag; and
a controller configured to:
receive the predetermined mounting position,
receive label information, the label information including a print position for pattern information to be printed on the printable label surface of the RFID tag, and
compare the predetermined mounting position to the print position and control the print head to print the pattern information only if the print position does not overlap a region through which the RFID chip passes when RFID tag is conveyed along a conveying direction past the thermal print head.

17. The apparatus according to claim 16, wherein the controller is further configured to:
generate a notification indicating the print position overlaps the region through which the RFID chip passes when comparison of the predetermined mounting position to the printing position indicates the print position overlaps the region.

18. The apparatus according to claim 16, wherein the thermal print head comprises a plurality of heating elements disposed along a direction intersecting the conveying direction.

19. The apparatus according to claim 18, wherein the controller is further configured to execute a dot missing check on the thermal print head by checking states of the plurality of heating elements.

20. The apparatus according to claim 19, wherein the controller is further configured to skip checking the states of any heating element at a position corresponding to the mounting position of the RFID chip.

* * * * *